Feb. 11, 1936.  R. H. CROSBY ET AL  2,030,245
PROCESS FOR TREATING MINERAL OIL DISTILLATES
Filed Nov. 10, 1933
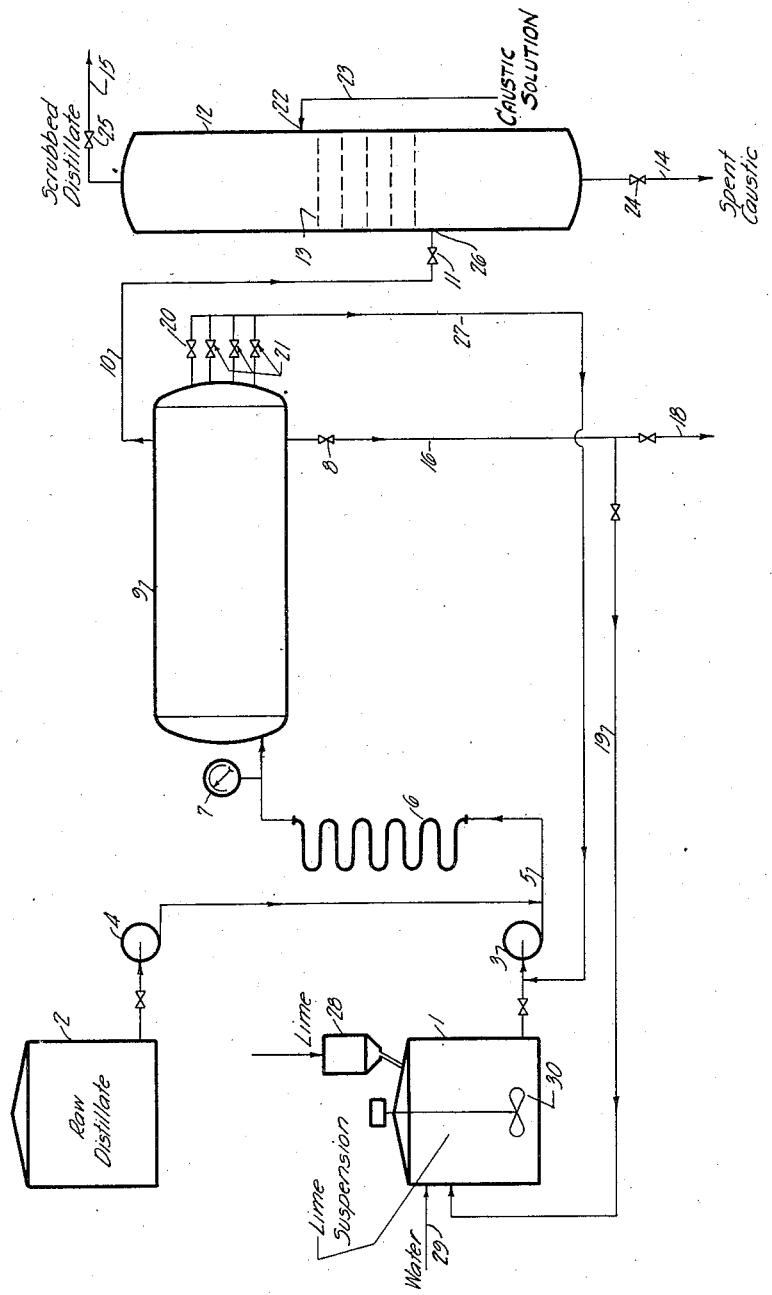
Inventors:
Ralph Hoagland Crosby
Bernard Richard Carney
By their Attorney:

Patented Feb. 11, 1936

2,030,245

UNITED STATES PATENT OFFICE 2,030,245

PROCESS FOR TREATING MINERAL OIL DISTILLATES

Ralph Hoagland Crosby, Hammond, and Bernard Richard Carney, East Chicago, Ind.

Application November 10, 1933, Serial No. 697,528

6 Claims. (Cl. 196—32)

Our invention pertains to the treatment of mineral oil products and particularly refers to the removal of hydrogen sulfide and other undesirable compounds from petroleum products, such as pressure distillates.

More specifically, it consists of a treatment with lime for the elimination of the hydrogen sulfide and other acid compounds from petroleum distillates, under pressure and exclusion of air whereby the formation of an objectionable emulsion is prevented and a sharp separation of the treated distillate from the spent treating mixture is possible.

It is known that various fractions obtained by distillation or by cracking sulfur-bearing mineral oils usually contain considerable quantities of hydrogen sulfide, and other acidic compounds. These are regarded as very undesirable components in mineral oil products on account of their corrosive characteristics as well as due to the fact that upon oxidation the elemental sulfur is liberated and becomes dissolved in the oil. It is customary, therefore, in oil refining practice to neutralize the freshly produced fractions with some alkaline reagent, such as caustic soda solution, or to subject such fractions to a stabilizing distillation treatment, whereby hydrogen sulfide is removed from the treated fractions together with other objectionable substances.

However, the caustic soda treating has its economical and technical disadvantages; it is rather expensive, even when operated in an efficient manner, and its effectiveness is somewhat impeded by the rapid exhaustion of the caustic solutions.

In view of these disadvantages, a treatment with slacked lime, either in the form of milk of lime or lime water, has sometimes been suggested instead of the caustic soda treatment, but for various reasons such substitution was not considered very satisfactory. The chief obstacle was the formation of emulsions which make the separation of the pressure distillate from the aqueous lime suspension very difficult. We have discovered that these emulsions are caused by air or gas bubbles incorporated or formed in the liquid during the mixing. To prevent this, it is our invention to exclude air from the pressure distillate and the alkaline suspension while they are mixed until they reach the settling zone and to keep the mixture during this time under sufficient pressure to prevent the formation of gas bubbles by evaporation or otherwise. Obviously the minimum pressure which will achieve this is equal to the vapor pressure of the gasoline at an infinitely small vapor to liquid ratio, less the atmospheric pressure. This pressure is generally termed bubble pressure. (Re. Proc. A. P. I. Jan 1930, Sec. III, pages 4–22).

The lime salts of the naphthenic acids formed during the lime treatment are soluble in oil and cannot be washed out with water alone. Therefore we may follow our lime treatment with a slight caustic soda treatment for the removal of these undesirable compounds.

We shall now briefly describe one way in which our process may be successfully carried out in two stages, that is, a lime stage and a caustic soda stage though it will be understood that we are not limited to this particular method, but may apply our process in a variety of ways so long as they are within the terms of the appended claims.

We prefer to subject to our treatment a pressure distillate which has been left to stand for a certain time in run-down tanks, so that a part of the hydrogen sulfide has been weathered from it. Of course fresh pressure distillate from the cracking units, or any other mineral oil distillate containing $H_2S$ or other acidic components, can be treated as well.

As treating reagent in our process we prefer to use a 2–5% suspension of lime in water. To prepare this, lime is dumped into a slurry tank where sufficient water is added to pump it to a supply tank. Here, more water is added until a 2–5% suspension of lime, by weight, is obtained. The tank may be equipped with steam coils, for heating during freezing weather, and open air coils or a mechanical mixer for stirring the lime suspension; good care should be taken not to make this stirring too violent and not to introduce any air bubbles in the liquid.

From the supply tank, a lime suspension stream is pumped into a mixer, where it is mixed with a stream of pressure distillate. This mixer consists of a series of U-bends of a pipe of suitable diameter, or any other means may be used for effecting a thorough contact between the two liquids, which are supplied to the mixer in a suitable ratio, as, for example, from 10 to 25 parts of pressure distillate to one part of lime suspension. The time of contact is regulated by the velocity of the stream; it has been observed that good results are obtained with a mixing period of one minute. The spent lime dissolves in the water principally as calcium hydrogen sulfide, while the major part of the unused lime remains in suspension.

To prevent the emulsion difficulties mentioned above, the mixer is operated under superatmospheric pressure preferably at about 20–45 lbs./sq. in. gauge, and usually at not less than 12 lbs./sq. in. gauge, so that the formation of gas bubbles is substantially prevented. Pressures above 35 lbs./sq. in. may sometimes be used if desired. Using as a mixer a closed tube as described, no special provision has to be made to exclude air; in preparing the lime suspension care must be taken not to incorporate air bubbles, as mentioned above.

After the mixing zone the pressure is released and the mixture of pressure distillate and lime suspension is conveyed to a separator, where the lime suspension settles below the pressure distillate in two clearly defined layers; the upper layer, next to the pressure distillate, contains practically all of the unused lime, while the lower layer consists of a clear aqueous solution of calcium hydrogen sulfide. This condition is very important from the standpoint of economy, since it allows a substantially complete exhaustion of the treating material without any waste. To accomplish this, we may withdraw from the process the inexhausted solution which settles in the middle layer and reintroduce it either separately or in mixture with fresh suspension of lime, into the mixing zone for treatment of further quantities of pressure distillate. The lower layer of spent aqueous solution, containing calcium hydrogen sulfide and calcium salts of organic acids removed from the treated distillate, is also withdrawn and either drained to the sewer or used instead of water for mixing fresh quantities of lime.

The neutralized and partly desulfurized distillate collecting in the separator is usually found to contain only a small quantity of H₂S, but, as stated before, may contain also an appreciable quantity of calcium salts of organic acids, which acids were originally present in the distillate. In order to remove these salts from the lime-treated distillate and to free it of the remaining H₂S, we may subject it to a treatment with caustic soda. This treatment may be carried out in any conventional manner under ordinary temperature and pressure conditions and requires only small quantities of weak caustic soda solutions of 15–30 Bé. gravity for the most economical removal of said calcium salts from the oil.

Referring to the drawing: lime suspension and raw distillate are picked up from tanks 1 and 2 by pumps 3 and 4, respectively, which pumps may be regulated by any conventional means to propel the liquids in the desired quantities. Distillate and lime are joined in T 5 and the mixture proceeds under superatmospheric pressure through mixer 6, which consists of a series of U-bends of suitable diameter. The pressure is indicated on pressure gauge 7 and may be controlled by valves 8, 11 and 21. The mixture enters the settling tank 9 under pressure, whereupon it separates into three layers: a top layer consisting of distillate, a middle layer consisting of lime suspension and a bottom layer consisting of spent lime solution.

The distillate proceeds under its own pressure through line 10 and pressure release valve 11 into the caustic scrubber 12. Caustic solution from a source not shown enters the scrubber 12 at an intermediate point 22 through line 23, and flows in countercurrent against the distillate entering the scrubber at point 26, which point is lower than the point of entrance 22 of the caustic solution. Baffle trays 13 between points 22 and 26 serve to mix the caustic solution and distillate, and the baffle-free spaces above and below points 22 and 26, respectively, are settling spaces, in which caustic and distillate separate.

Spent caustic and scrubbed distillate are withdrawn through valved lines 14 and 15, respectively. Pressure may be maintained in the scrubber, if desired, by means of valves 24 and 25.

Spent lime solution from the separating tank 9 is withdrawn through line 16 and may be discarded through line 18 or be returned to lime tank 1 through line 19.

The middle layer of settling tank 9 consisting of lime suspension, is withdrawn through manifold 20 and is returned to the suction side of pump 3 through line 27, to be mixed with fresh lime and distillate.

Fresh lime may be added to lime tank 1 through hopper 28 and water through line 29. Stirrer 30 may serve to keep the lime evenly distributed throughout the aqueous solution contained in tank 1.

Although we described our process with reference to lime as treating agent, other substances may equally well be used instead, such as hydrated iron oxide, magnesium hydroxide or other reagents insoluble in water and capable of reacting with hydrogen sulfide and other acidic components in mineral oil.

It is understood that our method may be carried out either as a continuous process or as a batch process by suitable changes in apparatus.

We claim as our invention:

1. In the treatment of liquid mineral oil distillate with an aqueous lime suspension to remove acidic substances, the method of preventing emulsification comprising intimately contacting the liquid distillate with the aqueous lime suspension in the absence of a gas and under a superatmospheric pressure not less than the bubble pressure of the distillate, to maintain the mixture resulting from the contacting entirely in the liquid form.

2. In the process of claim 1, effecting the mixing of the mineral oil distillate with the lime suspension under a pressure of at least 12 lbs./sq. in. gauge.

3. In the process of claim 1, mixing the mineral oil distillate with an aqueous suspension containing 2–5 per cent lime.

4. In the process of claim 1, mixing one part of the aqueous lime suspension with not less than 10, nor more than 25 parts of mineral oil distillate.

5. In the process of refining a mineral oil distillate containing acidic components, the steps of intimately mixing said distillate with an excess of an aqueous lime suspension in a treating zone in the absence of a gas under mixing conditions and a superatmospheric pressure sufficient to maintain the resulting mixture entirely in liquid form, allowing the mixture to settle whereby the mixture separates into three layers: the treated distillate as a top layer, the unspent lime suspension as a middle layer, and the exhausted aqueous solution as a bottom layer, and separately withdrawing each of the liquid layers.

6. In a continuous process of refining a mineral oil distillate containing acidic components, the steps of intimately mixing said distillate with an excess of an aqueous lime suspension in a treating zone in the absence of a gas under mixing conditions and a superatmospheric pressure sufficient to maintain the resulting mixture entirely in liquid form, thereby removing the major portion of acidic components allowing the mixture to settle, whereby the distillate separates as a top layer, the unspent lime suspension as a middle layer, and the exhausted aqueous solution as a bottom layer, continuously withdrawing the bottom layer, continuously withdrawing the middle layer and contacting it with untreated distillate, continuously withdrawing the treated distillate, and subjecting it to a caustic soda treatment thereby substantially completing removal of the acidic components.

RALPH HOAGLAND CROSBY.
BERNARD RICHARD CARNEY.